US008852492B2

(12) United States Patent
Schoenberger et al.

(10) Patent No.: US 8,852,492 B2
(45) Date of Patent: Oct. 7, 2014

(54) HEATING DEVICE AND HEATING METHOD FOR BLOW MOLDING MACHINE AS WELL AS BLOW MOLDING MACHINE

(75) Inventors: Wolfgang Schoenberger, Brennberg (DE); Frank Winzinger, Freising (DE); Andreas Wutz, Roding (DE); Christian Holzer, Schierling (DE)

(73) Assignee: Krones AG, Neutraubling (DE)

( * ) Notice: Subject to any disclaimer, the term of this patent is extended or adjusted under 35 U.S.C. 154(b) by 10 days.

(21) Appl. No.: 13/554,444

(22) Filed: Jul. 20, 2012

(65) Prior Publication Data

US 2013/0052295 A1   Feb. 28, 2013

(30) Foreign Application Priority Data

Aug. 22, 2011 (DE) .................. 10 2011 052 899

(51) Int. Cl.
*B29C 49/68* (2006.01)
*B29C 49/78* (2006.01)
*B29C 49/64* (2006.01)

(52) U.S. Cl.
CPC .............. *B29C 49/64* (2013.01); *B29C 49/786* (2013.01); *B29C 49/68* (2013.01)
USPC ......... 264/454; 425/135; 425/174.4; 425/526

(58) Field of Classification Search
USPC .............. 264/454, 458; 425/135, 174.4, 526
See application file for complete search history.

(56) References Cited

U.S. PATENT DOCUMENTS

| 4,923,395 | A | 5/1990 | Coxhead et al. |
| 6,005,223 | A * | 12/1999 | Ogihara .................. 219/388 |
| 7,798,800 | B2 | 9/2010 | Evrard |
| 2010/0295217 | A1* | 11/2010 | Forsthoevel et al. ....... 425/174.4 |
| 2011/0132892 | A1* | 6/2011 | Winzinger et al. ............ 219/420 |
| 2011/0135288 | A1 | 6/2011 | Winzinger et al. |

FOREIGN PATENT DOCUMENTS

| DE | 39 08 345 C1 | 1/1991 |
| DE | 42 12 248 A1 | 10/1993 |
| DE | 694 04 474 T2 | 2/1998 |
| DE | 197 36 462 A1 | 2/1999 |
| DE | 200 20 150 U1 | 4/2001 |
| DE | 20311657 U1 | 9/2004 |
| DE | 600 30 327 T2 | 10/2007 |
| DE | 10 2007 031 771 A1 | 1/2009 |
| DE | 102009047541 A1 | 6/2011 |
| DE | 102009057021 A1 | 6/2011 |
| EP | 0 328 653 A1 | 2/1989 |
| EP | 0 999 724 131 | 9/1999 |
| EP | 1 529 621 A1 | 5/2005 |
| WO | WO 97/03805 | 2/1997 |
| WO | WO 2011/063784 A2 | 6/2011 |

OTHER PUBLICATIONS

EPO Search Report dated Mar. 18, 2013 (App. No. 12175321.4-1706 and English translation.

* cited by examiner

*Primary Examiner* — Robert B Davis
(74) *Attorney, Agent, or Firm* — D. Peter Hochberg; Sean F. Mellino; Richard A. Wolf

(57) ABSTRACT

A heating device and a heating method for a blow molding machine comprise a heating element for radiating heat radiation for heating of preforms. A bottom reflector is movable relative to a counter reflector and is arranged opposite to the heating element for reflection of heat radiation radiated by the heating element in the direction of the preforms. A setting device is used for setting a position ($L_A$+BM, $L_B$+BM) of the bottom reflector relative to the counter reflector.

21 Claims, 9 Drawing Sheets

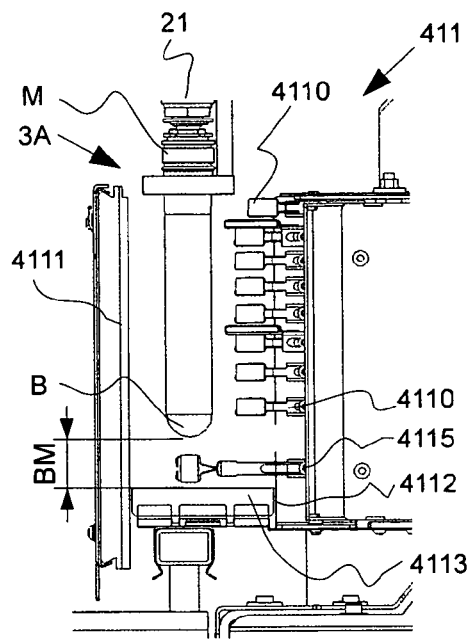
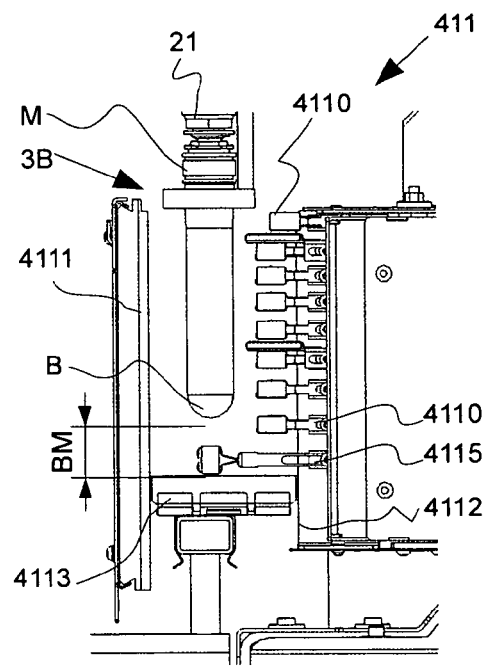
FIG. 8    FIG. 9
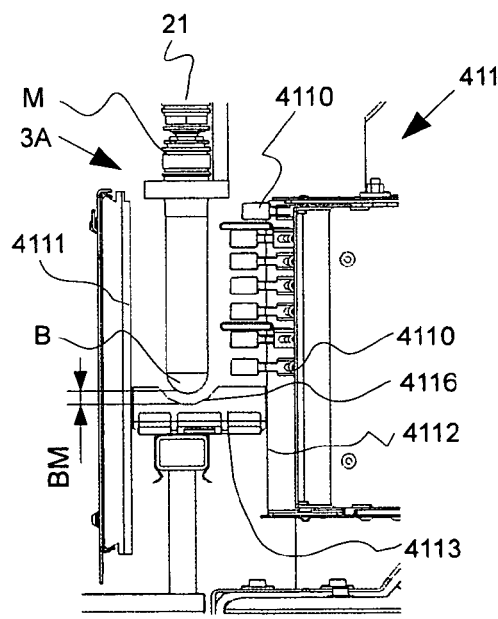
FIG. 10

HEATING DEVICE AND HEATING METHOD FOR BLOW MOLDING MACHINE AS WELL AS BLOW MOLDING MACHINE

CROSS-REFERENCE TO RELATED APPLICATIONS

This application claims priority from German patent application DE 10 2011 052 899.7 filed on Aug. 22, 2011 which is incorporated herein by this reference in its entirety.

BACKGROUND OF THE INVENTION

1. Field of the Invention

The invention relates to a heating device and a heating method for a blow molding machine.

2. Description of the Prior Art

Blow molding machines, or also stretch blow molding machines, for producing containers are used particularly in the beverage industry. Containers are particularly bottles, which are produced from preforms (parison) made of plastic material. For this, in such blow molding machines, the preforms are initially heated in a heating device to a temperature at which they are deformable, the so-called deforming temperature. Subsequently, the heated preforms are shaped into the form of the desired finished container in a blow molding device by blowing a gaseous medium therein. In stretch blow molding machines, the containers are stretched further with a stretching rod.

In the heating device, the preforms are transported on a transport way along heating modules. Herein, the preforms are held at their mouth piece by a mandrel, which is seated in rotatable manner in a chain link. Further, several chain links with the mandrels seated therein are connected with each other such that the chain links form an endless revolving chain and therewith the transport way.

The heating modules are arranged externally besides the transport way and supply heat to the preforms via infrared radiation (IR-radiation). The infrared radiation is in addition reflected by reflectors arranged besides the transport way and under the transport way or under the bottom of the preforms. In this way, the infrared radiation can be effectively used for the heating of the preforms.

In presently used heating devices, a universal or all-purpose setting of the heating modules is selected with which the majority of the preforms to be heated with the heating device can be worked. In case the blow molding machine shall produce containers having different container sizes, for example bottles with a volumetric capacity of maximal 0.5 liter, 1.0 liter or 1.5 liter, the heating device also has to heat preforms having different sizes. In the event of using a universal setting of the heating modules for the preforms having different sizes, the same energy amount is consumed for heating all of the preforms having different sizes. Thus, currently used heating devices have especially when heating shorter preforms inferior power efficiency as compared to the heating of longer preforms. At least the power efficiency in heating shorter preforms is therefore not optimal.

DE 60 2005 003 970 T2 (also published as US 2008/0102148 and now U.S. Pat. No. 7,798,800) discloses a method and a device for heating thermoplastic preforms, in which two holders can each be used for holding either a heat source for heating the preforms or a reflector for reflecting heat radiation of the heat source. The selection, whether at one of the two holders is to be held a heat source or a reflector is made by a user from case to case, wherein the user takes into account the size of the preform to be heated by the device. As the case may be, the space settable between the preform and the reflector is not optimal for the heating of the preform, since the holders are only present at predetermined locations. In addition, a changeover time for changing over the device from heating a longer preform to heating a shorter preform or vice versa is not insignificant short.

A suboptimal power efficiency of machines is indefensible under environmental considerations. Furthermore, for an operator of a heating device or of a blow molding machine, steady increasing energy costs result in increasing operational costs which should be reduced.

SUMMARY OF THE INVENTION

Thus, it is an object of the present invention to provide an improved heating device and an improved heating method for heating of preforms for a blow molding machine as well as an improved blow molding machine, in which particularly the heating process of the preforms and the heating device is realized more efficiently and thereby both the power efficiency thereof is improved and the operational costs are decreased. Moreover, the changeover time for changing over the heating device between the heating of different preforms should preferably be shortened at the same time.

The object is solved by a heating device for a blow molding machine. The heating device comprises a heating element for radiating heat radiation for heating of preforms, a bottom reflector being movable relative to a counter reflector arranged opposite to the heating element and being for reflection of heat radiation radiated by the heating element in direction of the preforms, and a setting device for setting a position of the bottom reflector relative to the counter reflector.

The term "heating element" means amongst other things a heat radiator, for example an IR-radiator. Furthermore, the radiation of microwave radiation or laser radiation can be meant therewith.

By the setting of the bottom reflector, particularly to a preform to be heated by the heating device, an optimal reflection of the applied heat radiation can be realized in direction of the respective preforms to be heated. Therewith, the heating process of the preforms in the heating device becomes more efficient. Due to this, needless energy losses are avoided when heating the preforms. As a result, the power efficiency of the heating device increases. In addition, the operational costs for operating the heating device can be considerably reduced.

In addition, the changeover time for changing over between the setting for producing a predetermined container size and the setting for producing another predetermined container size is reduced for the above-described heating device.

Advantageous further configurations of the heating device are as according to the presently claimed invention.

The heating device can further comprise a back reflector being arranged on the side of the heating element and being for reflection of heat radiation not absorbed by the preforms again back to the preform and/or the preforms arranged in front of or behind it, wherein the counter reflector and/or the back reflector are/is movable relative to the bottom reflector and/or the preform.

It is possible that the bottom reflector can be inserted into the counter reflector and/or the back reflector arranged on the side of the heating element, or that the counter reflector is configured flexible.

The setting device can be configured for continuous setting and/or fine setting of the bottom reflector, and/or the counter reflector and/or the back reflector can be continuously settable by a driving device.

Preferably, the heating device comprises a determining device for determining a predetermined position of the bottom reflector dependent on the length of a preform to be heated by the heating device, wherein the setting device is configured for setting the position of the bottom reflector dependent on the determination of the determining device.

The determining device can further comprise a storing device in which is stored a predetermined position of the bottom reflector dependent on the length of a preform to be heated by the heating device and/or a bottom reflector detecting device for detecting the position of the bottom reflector and/or a preform length detecting device for detecting the length of the preforms present in the heating device.

It is possible, that the bottom reflector detecting device and/or the preform length detecting device are/is arranged at the intake of the heating device as it is seen in the transport direction of the preforms. Alternatively, the preform length detecting device can also be arranged ahead of the heating device, advantageously in the preform supply or especially advantageous in a saw tooth star.

It is further possible that the heating device comprises a plurality of heating elements each being arranged adjacent to each other and side by side in direction of the length of the preforms and being for radiating heat radiation for heating the preforms. The number of the plurality of heating elements used for heating the preforms is adaptable by a control device on the basis of the determining result of the determining device.

The setting device can comprise for setting the position of the bottom reflector an electric or pneumatic or electromechanical driving device.

The bottom reflector can be arranged transverse to the counter reflector.

In a preferred configuration, the heating device comprises two heating paths arranged in parallel to each other and behind one another in the transport direction of the preforms, wherein each heating path comprises at least one bottom reflector, and wherein the setting device is configured for setting jointly the predetermined position of all of the bottom reflectors of the two heating paths.

Alternatively, an own setting device is present for each of the bottom reflectors. In this case, the setting devices are advantageously connected by a shared control device.

The setting device can further comprise: a first support device for supporting the bottom reflectors of a first heating path, a second support device for supporting the bottom reflectors of a second heating path, and a coupling device for coupling the first and second support device with a drive device arranged for driving the coupling device and therewith the first and second support device.

The bottom reflector can have a cavity on its side which is faced to the preforms, wherein the cavity corresponds to the form of the preforms.

The heating device can be configured such that the displacement of at least two limitations of their heating channel is performed by a shared drive, particularly automatically.

It is advantageous, in case the heating device is part of a blow molding machine for producing containers being for acceptance of a product and being formed from preforms.

The above-mentioned object is further solved by a heating method for a blow molding machine, according to which a bottom reflector is movable relative to a counter reflector arranged opposite to a heating element. The heating method comprises the steps of: setting a position of the bottom reflector relative to the counter reflector by a setting device, and reflecting heat radiation in the direction of preforms by the bottom reflector, the heat radiation being radiated by the heating element.

The above-mentioned object is further solved by a heating device for a blow molding machine. The heating device comprises a heating element for radiating heat radiation for heating preforms, and a reflector for reflecting heat radiation in the direction of preforms, the heat radiation being radiated by the heating element, wherein the reflector has a flexibly changeable form. Herein, the reflector can be a counter reflector arranged opposite to the heating element or the reflector can be made of a flexible material.

The above-mentioned object is further solved by a heating device for a blow molding machine. The heating device comprises a heating element for radiating heat radiation for heating preforms, and at least one reflector for reflecting heat radiation in the direction of the preforms, the heat radiation being radiated by the heating element, wherein at least one reflector comprises segments which are separately displaceable relative to the heating element or the preforms.

Herein, the reflector can be a counter reflector arranged opposite to the heating element, or a back reflector arranged on the side of the heating element, or a bottom reflector moveable transverse to the counter reflector or the back reflector.

Moreover, the segments can be arranged in the direction of the first transport direction of the preforms or transverse thereto.

Further possible implementations of the invention include also not explicitly mentioned combinations of features or configurations, which are described previously or in the following as regards the embodiments. Thereby, the person skilled in art will add also single aspects as enhancements or supplements to the respective basic form of the invention.

Further configurations of the invention are subject of the presently claimed invention as well as the embodiments of the invention described in the following:

BRIEF DESCRIPTION OF THE DRAWINGS

Subsequently, the invention is described in more detail with respect to the appended drawing and on the basis of embodiments.

FIG. 8 shows a partial sectional view of a heating device according to a third embodiment;

FIG. 9 shows a further partial sectional view of the heating device according to the third embodiment;

FIG. 10 shows a partial sectional view of a heating device according to a fourth embodiment;

In the figures, similar or functionally similar elements are provided with the same reference signs as long as nothing else is given.

First Embodiment

Figure 1:
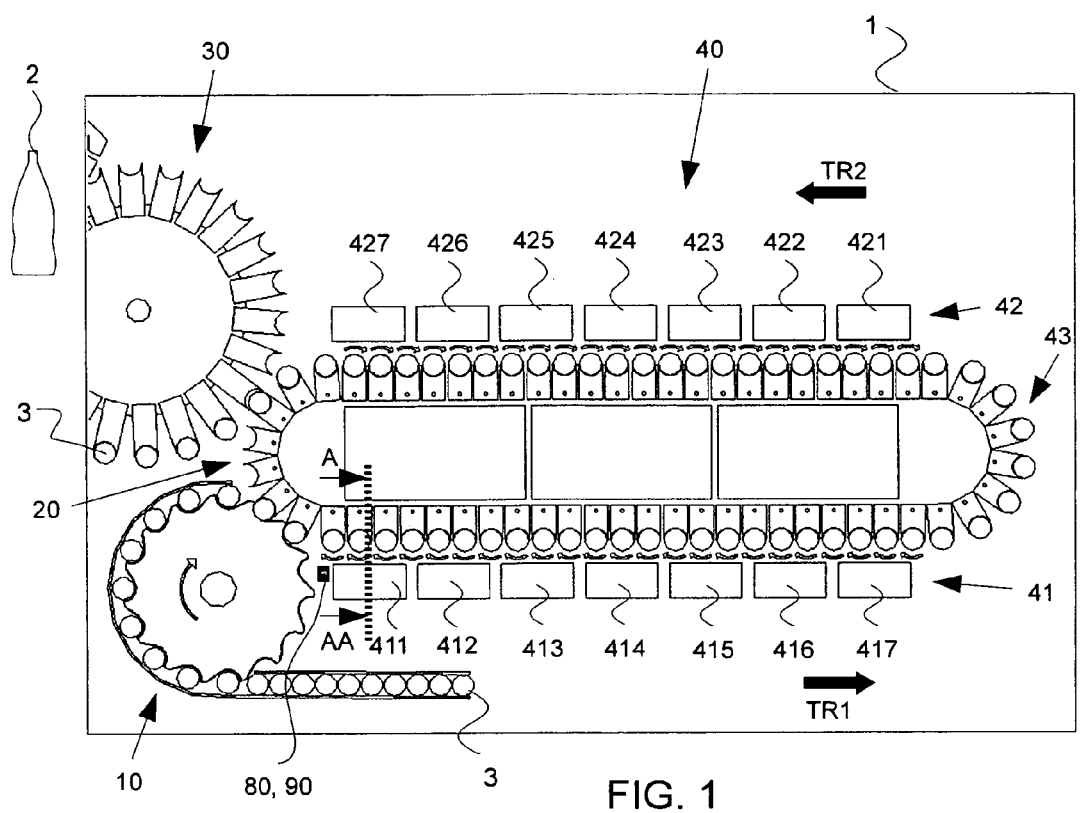
FIG. 1 shows a top view of a heating device according to a first embodiment.

FIG. 1 shows a part of a blow molding machine 1 for producing containers 2 from preforms 3 made of plastic material, like polyethylene terephthalate (PET), polypropylene (PP), etc. The finished containers 2 can be bottles, for example, as depicted in FIG. 1, in which a product can be filled. The product can be particularly a beverage, a cleansing agent, etc. The preforms 3 are depicted in FIG. 1 as circles for their mouth piece, wherein only two of the preforms 3, at the beginning (at the bottom in FIG. 1) and at the end (at the left in FIG. 1) of the row which they form, are provided with a reference sign for the sake of clear illustration.

The blow molding machine 1 in FIG. 1 comprises a first transport device 10, a second transport device 20, a third transport device 30, a heating device 40 and a blowing device, which is not shown and which is arranged downstream of the third transport device 30. In the blowing device, not shown, the preforms 3 heated by the heating device 40 can be blown into the desired form of the container 2 by blowing a gaseous medium therein. The blow molding machine 1 can be particularly a stretch blow molding machine. In FIG. 1, a bottom reflector detecting device 80 and a preform length detecting device 90 are further shown schematically at the intake of the heating device 40, the bottom reflector detecting device 80 and the preform length detecting device 90 being described in more detail by reference to FIG. 6 and FIG. 7.

The first, second and third transport devices 10, 20, 30 each serve for transporting of the plurality of preforms 3 depicted in FIG. 1. Herein, the preforms 3 each are arranged in the transport direction of the first to third transport devices 10, 20, 30 in succession in a row. The first transport device 10 is formed in FIG. 1 as a saw tooth star which is seated in rotatable manner, as shown in FIG. 1 by a rotating arrow on the first transport device 10. The first transport device 10 hands over the preforms 3 which it is holding to the second transport device 20. The second transport device 20 is a conveyance path, along which a first heating path 41 and a second heating path 42 of the heating device 40 is arranged and between which the heating device 40 has a diverting zone 43. The first and second heating paths 41, 42 each are linear heating paths. In the diverting zone 43, in which the preforms 3 are guided along a semicircle, the preforms 3 are diverted from a first transport direction TR1 in a second transport direction TR2. The first transport direction TR1 in which the preforms 3 are transported through the first heating path 41 is directed in FIG. 1 opposite to the second transport direction TR2, in which the preforms 3 are transported through the second heating path 42. In the second transport device 20, the preforms 3 are held at their mouth piece by a mandrel which is seated in rotatable manner in a chain link. Several chain links with the mandrels seated therein are connected with each other such that the chain links form an endless revolving chain and thereby, the transport way of the second transport device 20. After being run through the second transport way 42, the second transport device 20 hands over the preforms 3 to the third transport device 30 which is also seated in rotatable manner and which transports the preforms 3 heated by the heating device 40 further to the blowing device which is not shown. The preforms 3 are also heated with the heating device 40, during being transported by the second transport device 20 through the heating paths 41, 42, as described in more detail in the following. Herewith, the preforms 3 are rotated around their axis by the mandrel, as shown in FIG. 1 by small white rotating block arrows.

The first heating path 41 serves for a first heating of the preforms 3. Herein, the preforms 3 are heated evenly at their perimeter. The first heating path 41 has a plurality of heating modules, that is to say a first heating module 411, a second heating module 412, a third heating module 413, a fourth heating module 414, a fifth heating module 415, a sixth heating module 416, and a seventh heating module 417. The heating modules 411 to 417 are arranged in this sequence in direction of the first transport direction TR1 in succession in a row.

The number of the heating modules 411 to 417 is individually adjustable and depends on the necessary heating time or the number of heating elements.

The second heating path 42 serves for a second heating of the preforms 3. Herein, the preforms 3 are heated to the final temperature at which they can be deformed by the blowing device, which is not shown, in a container 2. The final temperature is also named deforming temperature of the preforms 3. The second heating path 42 also has a plurality of heating modules, namely a first heating module 421, a second heating module 422, a third heating module 423, a fourth heating module 424, a fifth heating module 425, a sixth heating module 426, and a seventh heating module 427. The heating modules 421 to 427 are arranged in this sequence in the direction of the second transport direction TR2 in succession in a row. In the diverting zone 43, no heating of the preforms 3 is performed by the heating paths or heating modules.

The heating modules 411 to 417 of the first heating path 41 and the heating modules 421 to 427 of the second heating path 42 are shown in FIG. 1 for simplifying the illustration as being arranged each externally beside the conveyance path formed by the second transport device 20. The detailed configuration and arrangement of the heating modules 411 to 417 of the first heating path 41 and of the heating modules 421 to 427 of the second heating path 42 is derivable from FIG. 2 and FIG. 3.

Figure 2:
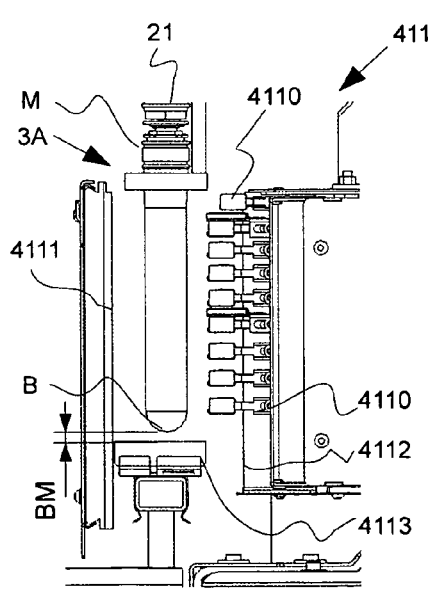
FIG. 2 shows a partial sectional view of the heating device according to the first embodiment.

FIG. 2 shows a cross section seen in the direction of the arrows A/AA and made along the bold broken line in FIG. 1 across the first heating module 411 of the first heating path 41 for a case, in which the second transport device 20 transports longer preforms 3A through the first heating module 411. A longer preform 3A is a preform 3, for example, from which a container 2 or a bottle with a maximal content of 1.0 liter shall be formed. Each preform 3 is usually an injection molding part with a bottom B and a mouth piece M corresponding already to the mouth piece of the finished container 2. As described above, a mandrel 21 of the second transport device 20 engages with the mouth piece M. The preform 3 or 3A can be rotated around its longitudinal axis by the mandrel 21. The heating modules 412 to 417 of the first heating path 41 and the heating modules 421 to 427 of the second heating path 42 each are constructed in the same way as the first heating module 411 of the first heating path 41, so that for their construction reference is made to the description of the first heating module 411, as well.

The first heating module 411 has a plurality of heating elements 4110 arranged in FIG. 2 on the right side of the preforms 3A. The plurality of heating elements 4110 is arranged in a row one over another. In FIG. 2, only the top most and the bottom most heating element 4110 are provided with a reference sign for the sake of clear illustration.

In addition, each heating element 4110 is an elongated radiator, the length of which is arranged in the direction of the first transport direction TR1 or which elongates in the direction of the first transport direction TR1. Each heating element 4110 serves for radiating heat radiation to the preform 3A, which heat radiation heats the preform 3A. The heat radiation is particularly infrared radiation (IR-Radiation). On the left side of the preform 3A is arranged a counter reflector 4111 which elongates both in direction of the length of the preform 3A (the vertical in FIG. 2) and in direction of the transport direction TR1. The counter reflector 4111 reflects the heat radiation which is not absorbed by the preforms 3A back to the preform 3A or the preforms 3A being arranged in front of or behind it. In addition, a back reflector 4112 is provided on the side of the heating elements 4110, the back reflector 4112 being for reflecting the heat radiation which was not already absorbed by the preforms 3A again back to the preform 3A or the preforms 3A being arranged in front of or behind it. Moreover, a bottom reflector 4113 being adjustable in height is arranged under the preform 3A, the bottom reflector 4113 being also for reflecting the heat radiation which was not absorbed by the preforms 3A again back to the preform 3A or the preforms 3A arranged in front of or behind it. The bottom reflector 4113 reflects the heat radiation particularly in direction of the bottom of the preforms 3A which are to be heated. The bottom reflector 4113 is arranged transverse to the back reflector 4112 and to the counter reflector 4111. Transverse means here, that the arrangement of the bottom reflector can be different from the exact transverse direction by up to 10°. Because of the arrangement of heating elements 4110, counter reflector 4111 and bottom reflector 4113, the bottom reflector 4113 is moveable between the heating element and the counter reflector. In other words, the bottom reflector 4113 is moveable relative to the counter reflector 4111. Further, the bottom reflector 4113 is moveable relative to the heating elements 4110.

The bottom reflector 4113 is arranged near to the bottom B of the preform 3A or the bottoms B of the preforms 3A. In further detail, it is set a predetermined pitch BM between the bottom B and the bottom reflector 4113. Herein, the bottom reflector 4113 is shifted as far as possible up to the bottom B of the preform 3A, to both optimally used the heat radiation and to ensure, that the preform 3A is not overheated. Altogether, the counter reflector 4111, the back reflector 4112 with the heating elements 4110, and the bottom reflector 4113 form together a heating channel being approximately U-shaped and relatively closed and through which the second transport device 20 transports the preforms 3A. Because of the small predetermined pitch BM between the bottom reflector 4113 and the bottom of the preform 3A or the preforms 3A it is ensured that the heat radiation emitted from the heating elements 4110 is optimally used by the longer preforms 3A. Hardly any heat radiation is lost unused.

Figure 3:
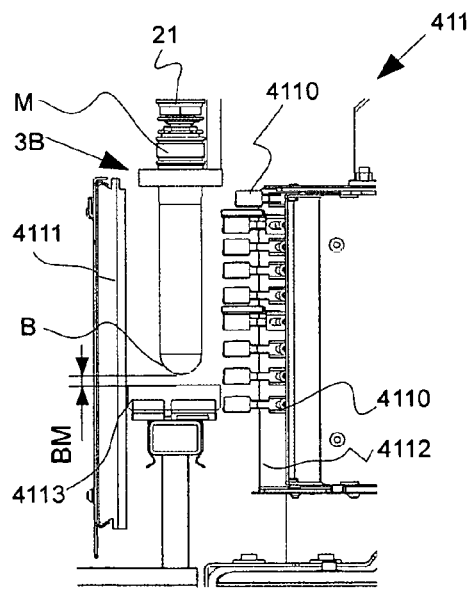
FIG. 3 shows a further partial sectional view of the heating device according to the first embodiment.

FIG. 3 shows the cross section of FIG. 2 through the first heating module 411 of the first heating path 41, when the second transport device 20 transports a shorter preform 3B through the module 411. The shorter preform 3B is for example a preform 3, from which a container 2 or a bottle with a maximal content of approximately 0.5 liter shall be formed. In this case, the bottom reflector 4113 is shifted or set further up than in the case shown in FIG. 2 so that again, the counter reflector 4111, the back reflector 4112 with the heating elements 4110, and the bottom reflector 4113 form together an approximately U-shaped and relatively close heating channel through which the second transport device 20 transports the shorter preforms 3B. Here again, a smaller predetermined pitch BM between the bottom reflector 4113 and the bottom B of the shorter preforms 3B is present, as described with reference to FIG. 2. Thereby, it is ensured, that the heat radiation emitted by the heating elements 410 can not only be used optimally when it comes to longer preforms 3A but also when it comes to shorter preforms 3B. Also in this case, hardly any heat radiation is lost unused.

In this way, the heat radiation can be used effectively for the heating of preforms 3 of different sizes (preforms 3A, 3B). For further energy saving, the both lower heating elements 4110 in FIG. 3 can be deactivated when heating shorter preforms 3B, for example they can be switched off or alternatively be drawn away and be switched off, so that only the heating elements 4110 are applied for heating the preforms 3 or 3A, 3B, which are actually necessary for the heating of the preforms 3 or 3A, 3B. That means, the both lower heating elements 4110 in FIG. 2 are only used when heating a longer preform 3A, whereas they are not used when heating a shorter preform 3B. Thus, when heating a longer preform 3A, only a part of the heating elements 4110 is used which are necessary for heating the longer preform 3A.

The heating modules 411 to 417 of the first heating path 41 as well as its reflectors 4111, 4112, 4113 are arranged with a predetermined space to one another to ensure an air circulation around the preforms 3 or 3A, 3B. Further, a predetermined space is provided between the preforms 3 or 3A, 3B and the heating elements 4110 as well as the reflectors 4111, 4112, 4113, respectively, so that also here an air circulation around the preforms is possible. The heating modules 421 to 427 of the second heating path 42 are constructed and arranged in the same way. Because of the air circulation in the first and second heating path 41, 42, an overheating of the preforms 3 or 3A, 3B in the heating device 40 can be avoided.

Figure 4:
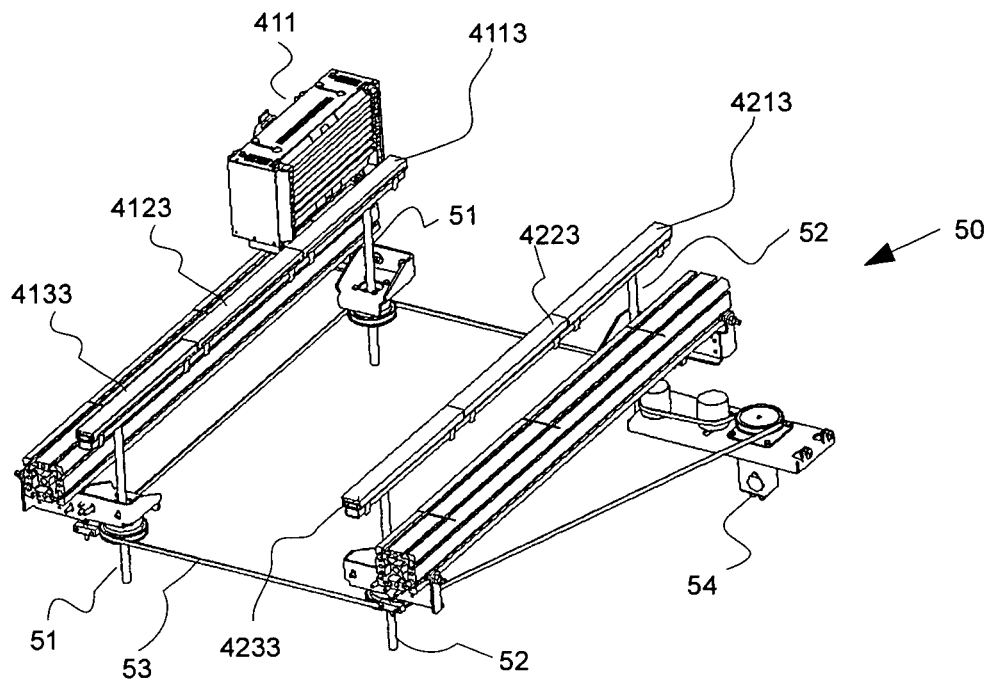
FIG. 4 shows a perspective view of a setting device according to the first embodiment.
Figure 5:
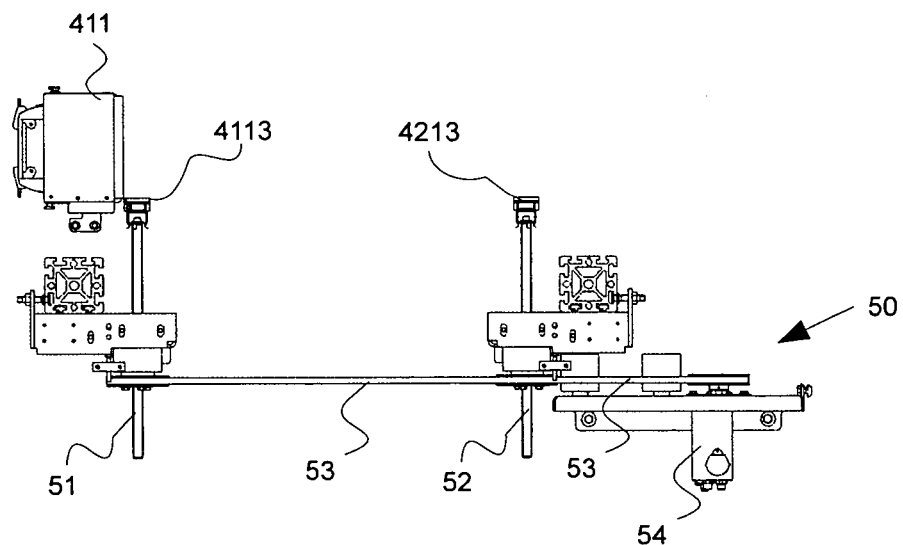
FIG. 5 shows a sectional view of the setting device according to the first embodiment.

FIG. 4 and FIG. 5 show a setting device 50 of the blow molding machine 1, with which the bottom reflector 4113 of the heating module 411 and together with it all other bottom reflectors of the heating modules 412 to 417 and 421 to 427 can be displaced in their position, particularly in their height. Alternatively, it is possible, that only one single continuous bottom reflector 4113 is provided in each heating path 41. In FIG. 4 and FIG. 5 are shown, for the sake of clear illustration, only the heating module 411 of the first heating path 41, its bottom reflector 4113, the bottom reflector 4123 of the second heating module 412 of the first heating path 41, the bottom reflector 4133 of the third heating module 413 of the first heating path 41, the bottom reflector 4213 of the first heating module 421 of the second heating path 42, the bottom reflector 4223 of the second heating module 422 of the second heating path 42, and the bottom reflector 4233 of the third heating module 423 of the second heating path 42. The bottom reflector 4113, the bottom reflector 4123 and the bottom reflector 4133 of the first heating path 41 are supported by two rods 51 which are accomplished as thread mandrel. The two rods 51 are a first support device for supporting the bottom reflectors 4113, 4123, 4133 of the first heating path 41. The bottom reflector 4213, the bottom reflector 4223 and the bottom reflector 4233 of the second heating path 42 are supported by two further rods 52 which are also accomplished as thread mandrel. The two rods 52 are a second support device for supporting the bottom reflectors 4213, 4223, 4233 of the second heating path 42. The rods 51 and 52 or the first and second supporting devices 51, 52 are coupled with each other and the driving device 54 by a strap 53 placed around them. The strap 53 is a coupling device for coupling the first and second supporting devices 51, 52 with the driving device 54. Thus, a driving of the strap 53 brought about by the driving device 54 causes a rotation of the rods 51, 52 around their axis, which results in a joint and synchronous displacement of all bottom reflectors of the heating modules of the first and second heating paths 41, 42. The bottom reflectors of the heating modules of the first and second heating paths 41, 42 can also be displaced centrally. The driving device 54 can be an electric, pneumatic or electro mechanic displacement driving device, for example.

The setting of the position of the bottom reflectors of the heating modules 411 to 417 and 421 to 427 by the setting device 50 can be performed by a user via a switch or push button of an operator panel of the heating device 40 or of the blow molding machine 1. That means, the setting of the position of the bottom reflectors by the use of the setting device 50 takes place automatically. Advantageously, a continuous fine setting is performed, which thus can be adjusted optimally to each preform length.

As an alternative thereto, the bottom reflectors of the heating modules 411 to 417 and 421 to 427 can be automatically set with the setting device 50, as described in the following with reference to a modification of the first embodiment.

Figure 6:
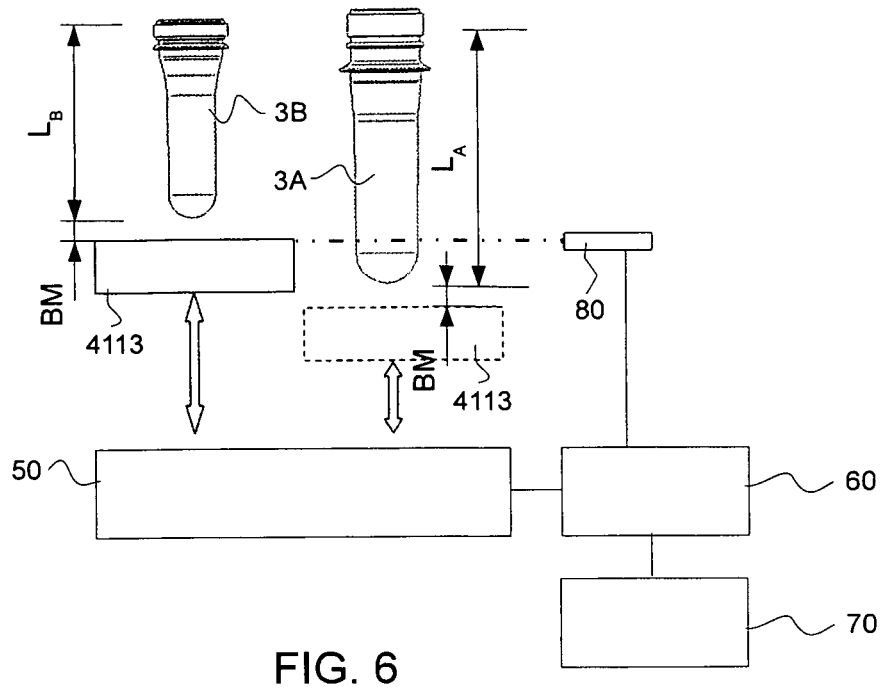
FIG. 6 shows a schematic drawing for illustrating the height displacement of a bottom reflector dependent on the length of a preform according to a modification of the first embodiment.

FIG. 6 shows a schematic diagram for illustration of the height displacement of the bottom reflectors of the heating modules 411 to 417 and 421 to 427 by the use of the setting device 50. The setting device 50 is controlled by a control device 60 of the blow molding machine 1. For the control of the blow molding machine 1, the control device 60 accesses a storing device 70, in which preform data as for example the length $L_A$, $L_B$, the diameter, the material, the wall thickness etc. of the preform 3 or the preforms 3A, 3B are stored. In the storing device 70 is further stored the position, and particularly a height, of the bottom reflectors of the heating modules 411 to 417 and 421 to 427 suitable for the respective preform 3 or 3A, 3B for the operation of the blow molding machine 1 with this preform 3 or 3A, 3B. The suitable position, and particularly the height, of the bottom reflectors have such an amount, that the predetermined pitch BM between the bottom B of the preform 3 or the preforms 3A, 3B and the bottom reflectors of the heating modules 411 to 417 and 421 to 427 is set when operating the blow molding machine 1. The storing device 70 is part of a determining device for determining a predetermined position of a bottom reflector dependent on the length of a preform 3 or 3A, 3B to be heated by the heating device 40. The control device 60 being also part of the determining device controls the setting device 50, particularly the driving device 54 (cf. FIG. 4 and FIG. 5), such that the position, and particularly the height, of the bottom reflectors 4113 etc. is equal to the height stored in the storing device 70.

Moreover, the control device 60 can receive a detection signal of a bottom reflector detecting device 80 which detects the position, and particularly the height, of a bottom reflector, for example of the bottom reflector 4113, and thereby the position, and particularly the height, of all of the bottom reflectors of the heating modules 411 to 417 and 421 to 427. A bottom reflector detecting device 80 can be, in addition to the storing device 70, part of the determining device. A bottom reflector detecting device 80 can be a transmitter in the driving device 54 (cf. FIG. 4 and FIG. 5), displacement transducer, etc., for example. The bottom reflector detecting device 80 can be arranged at the intake of the heating device 40, that is, in front of the first heating module 411 of the first heating path 41 as it is seen in the direction of the first transport direction TR1 (cf. FIG. 1).

The control device 60 can compare the height of the bottom reflectors detected by the bottom reflector detecting device 80 with the height stored in the storing device 70 for the preforms 3 or 3A, 3B to be handled at this stage with the blow molding machine 1. In case the result of the comparison is that the detection signal of the bottom reflector detecting device 80 is different from the position, and particularly the height, stored in the storing device 70, the control device 60 controls the setting device 50, particularly the driving device 54 (cf. FIG. 4 and FIG. 5) such that the position, and particularly the height, of the bottom reflectors 4113 etc. is equal to the height stored in the storing device 70. Thus, the control device 60 controls the setting device 50, particularly the driving device 54, on the basis of the detection signal detected by the bottom reflector detecting device 80. The blow molding machine 1, particularly the heating device 40, changes over automatically to the currently to be worked preforms 3 or 3A, 3B. The predetermined position of the bottom reflector 4113 set by the setting device 50 is also a result of the addition of $L_A$+BM or $L_B$+BM.

With the setting device 50, a very precise and especially reproducible positioning of the bottom reflector of the heating modules 411 to 417 and 421 to 427 can be secured. In this way it is also ensured, that after a type change, which is a change between preforms having different lengths, the precisely same position of the bottom reflectors in the heating device 40 remains set. This affects positively the heating process of the preforms 3 or 3A, 3B, which results in a steady quality of the finished containers 2. Due to this, the blow molding machine 1 produces less degraded material.

Furthermore, because of the central motor-driven setting of the bottom reflectors of the heating modules 411 to 417 and 421 to 427 by the setting device 50 to a predetermined height, very low to no production failure times (changing time/fittings changing time) exist when performing a type change.

Moreover, wrong settings can be avoided when performing a type change, since a change can be performed unattended (without a user) via the machine control.

Altogether, the operational costs of the heating device 40 and thus, the blow molding machine 1, can be decreased due to these advantages.

Second Embodiment

Figure 7:
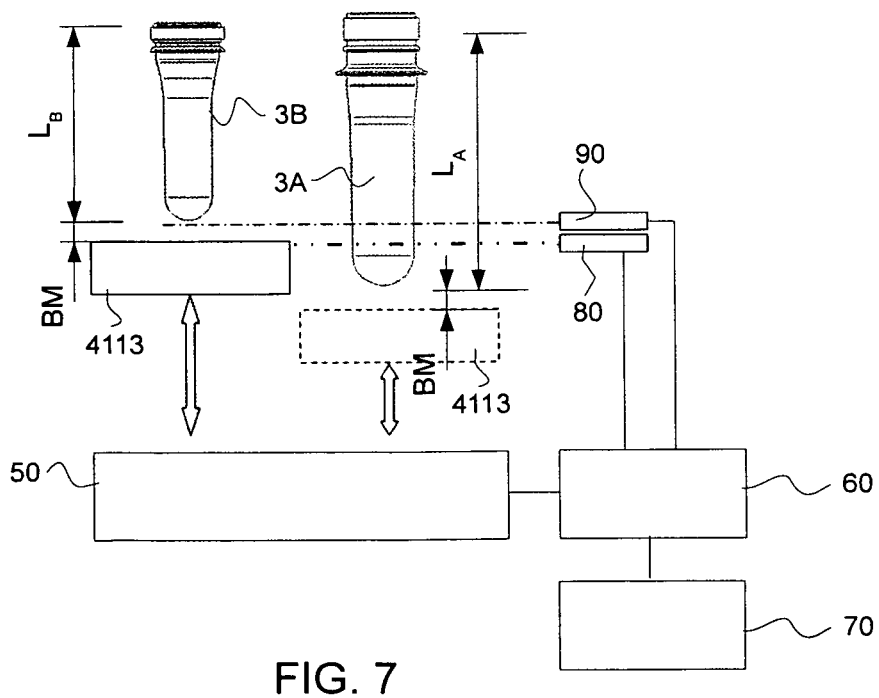
FIG. 7 shows a schematic drawing for illustrating the height displacement of the bottom reflector dependent on the length of a preform according to a second embodiment.

FIG. 7 shows a similar diagram, as it is shown in FIG. 6 with reference to the first embodiment, for explanation of the second embodiment of the blow molding machine 1. The blow molding machine 1 of the second embodiment is constructed in many parts in the same way as the blow molding machine 1 of the first embodiment. Therefore, only the differences between the first and second embodiments are described in the following. For the rest, it is referred to the description of the first embodiment.

In contrast to the first embodiment, the blow molding machine 1 of the second embodiment comprises in addition a preform length detecting device 90 for detecting the length $L_A$, $L_B$ of the preforms 3 or 3A, 3B which are transported in the heating device 40 by the second transport device 20, as shown in FIG. 7. The preform length detecting device 90 is arranged at the intake of the heating device 40, that means in the direction of the first transport direction TR1 (cf. FIG. 1), in front of the first heating module 411 of the first heating path 41. In this case, the control device 60 controls the setting device 50, particularly the driving device 54 (cf. FIG. 4 and FIG. 5), on the basis of the detection signal of the bottom reflector detecting device 80 and the preform length detecting device 90. The blow molding machine 1, particularly the heating device 40, again changes over automatically to the preform 3 or 3A, 3B to be currently worked. The preform length detecting device 90 is, among the control device 60, the storing device 70 and the bottom reflector detecting device 80, part of the determining device.

For example, the control performed by the control device 60 functions such that the control device 60 takes out of the storing device 70 the height of the bottom reflector of the heating modules 411 to 417 and 421 to 427 and the length $L_A$, $L_B$ of the corresponding preform 3, or 3A, 3B. The control device 60 compares the height of the bottom reflectors with the detecting signal of the bottom reflector detecting device 80 and the length $L_A$, $L_B$ of the corresponding preform 3A or 3B with the detecting signal of the preform length detecting device 90. Depending on the result of the comparison, namely if the detection signal of the bottom reflector detecting device 80 is different from the height stored in the storing device 70 and/or the detecting signal of the preform length detecting device 90 is different from the length $L_A$, $L_B$ stored in the storing device 70, the control device 60 controls the setting device 50, particularly the driving device 54, such that the height of the bottom reflectors 4113 etc. is equal to the height stored in the storing device 70.

With the blow molding machine 1 of the second embodiment it can be ensured, that the bottom reflector of the heating modules 411 to 417 and 421 to 427 is set corresponding to the actually used preform 3, when a short preform 3B is changed to a long preform 3A or vice versa in a type change. Thereby, it is no longer possible, compared to a displacement by a user, that a displacement of the bottom reflectors of the heating modules 411 to 417 and 421 to 427 is forgotten by a user. Consequently, the safety of the machine can be increased remarkably. In addition, the blow molding machine 1 of the second embodiment comprises also the above-mentioned advantages of the blow molding machine 1 of the first embodiment.

In a modification of the second embodiment, the preform length detecting device 90 is provided instead of the bottom reflector detecting device 80 and is part of the determining device. In this case, the control of the setting device 50 functions analogue to the control described with reference to the first embodiment. Consequently, the same advantages are achieved as mentioned for the first embodiment.

Third Embodiment

FIG. 8 shows a cross section seen in the direction of the arrows A; AA and made along the bold broken line in FIG. 1 across the first heating module 411 of the first heating path 41 according to the third embodiment. The blow molding machine 1 of the third embodiment is constructed in many parts in the same way as the blow molding machine 1 of the first embodiment. Therefore, only the differences between the first and third embodiments are described in the following. For the rest, it is referred to the description of the first embodiment.

FIG. 8 shows a case, in which the second transport device 20 transports longer preforms 3A through the first heating module 411. A longer preform 3A is also here for example a preform 3 from which a container 2 or a bottle with a maximal content of approximately 1.0 liter shall be formed.

FIG. 9 shows a case, in which the second transport device 20 transports shorter preforms 3B through the first heating module 411. A shorter preform 3B is also here for example a preform 3 from which a container 2 or a bottle with a maximal content of approximately 0.5 liter shall be formed.

In contrast to the first embodiment, a heating element 4115 arranged between the bottom B of the preform 3A and the bottom reflector 4113 is present in this embodiment in FIG. 8 and FIG. 9. This heating element 4115 radiates likewise a heat radiation, particularly infrared radiation, and is also called top radiator. Also here, a predetermined pitch BM being set optimally in regard to an exploitation of the heat radiation of the heating elements 4110 and 4115 is set between the bottom reflector 4113 and the bottom B of the preform 3A or 3B. In this embodiment, also the heating element 4115 is to be displaced in addition to the height displacement of the bottom reflector 4113, which is performed in correspondence to the first embodiment. This can be performed for example via a corresponding rail mechanism, which is not shown, at the carrier system of the heating element 4115.

The blow molding machine 1 of the third embodiment has the same advantages as they are mentioned above for the blow molding machine 1 of the first embodiment.

Fourth Embodiment

FIG. 10 shows a cross section seen in the direction of the arrows A/AA and made along the bold broken line in FIG. 1 across the first heating module 411 of the first heating path 41 according to the fourth embodiment. The blow molding machine 1 of the fourth embodiment, too, is constructed in many parts in the same way as the blow molding machine 1 of the first embodiment. Therefore, only the differences between the first and fourth embodiments are described in the following. For the rest, it is referred to the description of the first embodiment.

The bottom reflector 4113 of the heating modules 411 of the fourth embodiment has a cavity 4116 in the form of a curvature adapted to the bottom B of the preform 3. Generally speaking, the geometry of the bottom reflector 4113 is thus adapted to the geometry of the bottom B of the preform 3.

As a modification of the fourth embodiment, the bottom reflector 4113 of the heating module 411 can have as a cavity 4116 also a V-profile, a W-profile or similar instead of the curvature. The geometry of the bottom reflector 4113 is also adapted in such a form to the geometry of the bottom B of the preform 3.

The bottom reflector 4113 of this embodiment and its modifications can reflect especially effectively the radiation emitted from the heating element 4110 to the rounded bottom B of the preform 3. Particularly, an even shorter pitch BM between the bottom reflector 4113 of this embodiment and its modifications and the bottom B of the preform 3 is possible as compared to the other embodiments. As a result, a more efficient use of the applied energy is realized.

Fifth Embodiment

Figure 11:
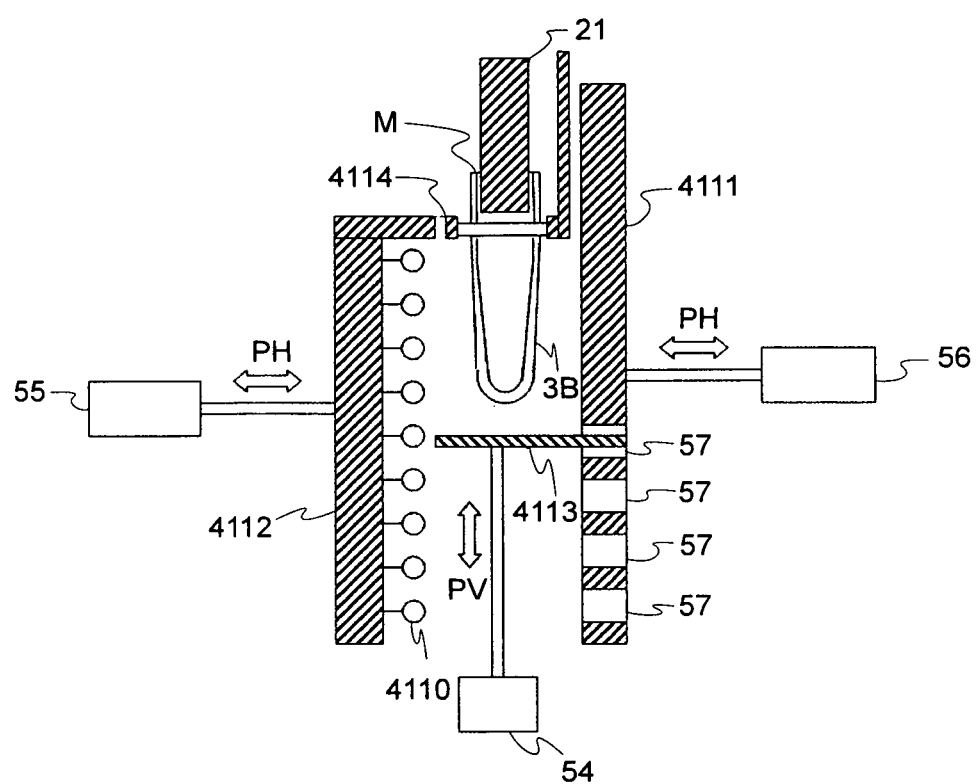
FIG. 11 to FIG. 14 each show a partial sectional view of a heating device according to a fifth embodiment.

FIG. 11 shows a cross section which is seen opposite to the direction of the arrows A/AA and made along the bold broken line in FIG. 1 across the first heating module 411 of the first heating path 41 according to the fifth embodiment. Due to this, the heating elements 4110 are arranged here on the left side in FIG. 11. In FIG. 11, not all of the heating elements 4110 are provided with a reference sign for the sake of clear illustration. Also the blow molding machine 1 of this embodiment is constructed in many parts in the same way as the blow molding machine 1 of the first embodiment. Therefore, only the differences between the first embodiment and this embodiment are described in the following. For the rest, it is referred to the description of the first embodiment.

As shown in FIG. 11, the counter reflector 4111, the back reflector 4112 and the bottom reflector 4113 each are arranged moveable to each other in this embodiment, by driving them by one of the driving devices 54, 55, 56 in direction of the arrows PH, PV. Particularly, the counter reflector 4111, the back reflector 4112, and the bottom reflector 4113 each are translatory moveable to each other. The counter reflector 4111 is formed herein such that the bottom reflector 4113 is inserted at its one end in a top most opening 57 of plural openings 57 of the counter reflector 4111, which are arranged one below the other.

In FIG. 11, one preform 3B is held with the mandrel 21, wherein a top reflector 4114, for example shaped in the form of a plate surrounding the mouth piece M, is arranged in the vicinity of its mouth piece M. The top reflector 4114 is for shielding the radiation of the heating elements 4110 against leaking out of the top of the compartment formed between the reflectors 4111 to 4113. Due to this, the top reflector 4114 can also be referred to as a shielding unit. Also the top reflector 4114 can be translatory moveable even if this is not shown in FIG. 11.

It is preferable, that the heating elements 4110 arranged below the bottom reflector 4113 are switched off in operation. As a result, additional unnecessary energy consumption can be prevented.

Here, the heating elements 4110 together with the back reflector 4112 as well as the counter reflector 4111, the bottom reflector 4113, and the top reflector 4114 form together a relatively closed heating channel. The reflectors 4111, 4113, 4114 and the heating elements 4110 can also be referred to as limitations of this heating channel. Because of the displacability or adjustability of at least two limitations, namely of at least one of the reflectors 4111, 4113, 4114 and/or the heating elements 4110 and the back reflector 4112 of the heating channel, the heating channel located around the preform 3B can be further reduced. The heating channel can be even further reduced with at least three displaceable limitations. Preferably, at least two limitations are automatically displaceable by a common or two driving devices 54, 55, 56. In case of a common drive, at least two limitations—particularly the limitation formed by the heating elements 4110 and the limitation formed by the counter reflector 4111—are coupled with each other by a hinge which is not shown.

It is also possible, as it is made in the first embodiment, to detect the geometry of one preform 3 or 3A, 3B in front of the first heating module 411, to supply the detection result to the control device 60 (FIG. 6 and FIG. 7) and to automatically displace at least one limitation, preferably two, more preferably three limitations, on the basis of the detection result. Such a displacement is effected similar to the displacement described in detail as regards the bottom reflector 4113 with respect to the first embodiment. That means, that particularly because of the preform data, as for example the geometry of a preform 3 or 3A, 3B stored in the storing device 70 (FIG. 6 and FIG. 7) an automatic and optimal setting can be ensured with respect to the energy consumption of the heating elements 4110 or the reflectors 4111 to 4114.

However, in principle a manual displacement of at least one limitation is also possible. Combinations of an automatic and manual displacement of different limitations are conceivable, too.

It is further possible to configure the limitations displaceable only in specific areas along the transport path of the preforms 3 or 3A, 3B. For cost reasons, the last quarter or the whole return path, that is the last half of the heating device 40, particularly the second heating path 42 of the heating device 40 or a part thereof, could be configured to be not displaceable, for example since these heating modules are not at all necessary for some preforms.

Figure 14:
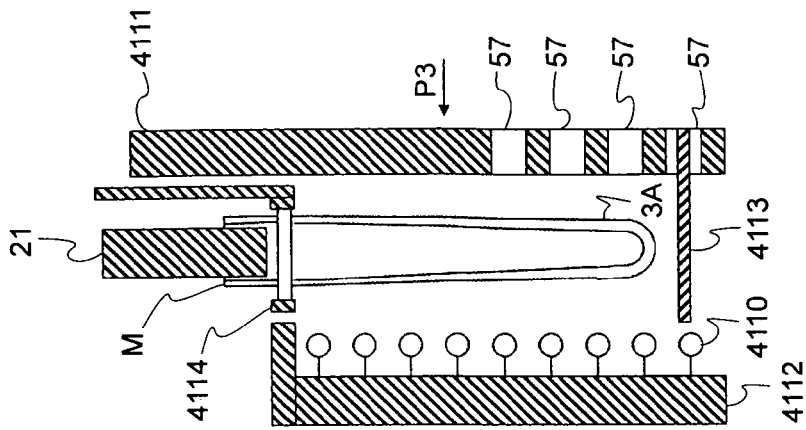
Figure 13:
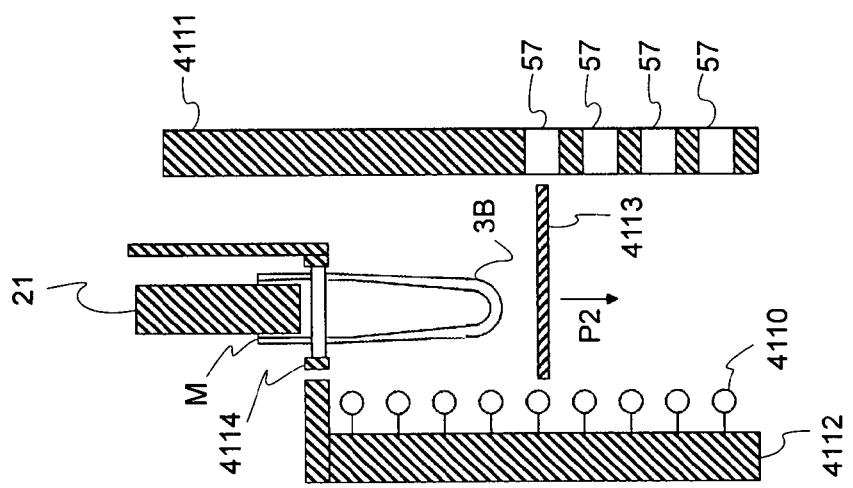
Figure 12:
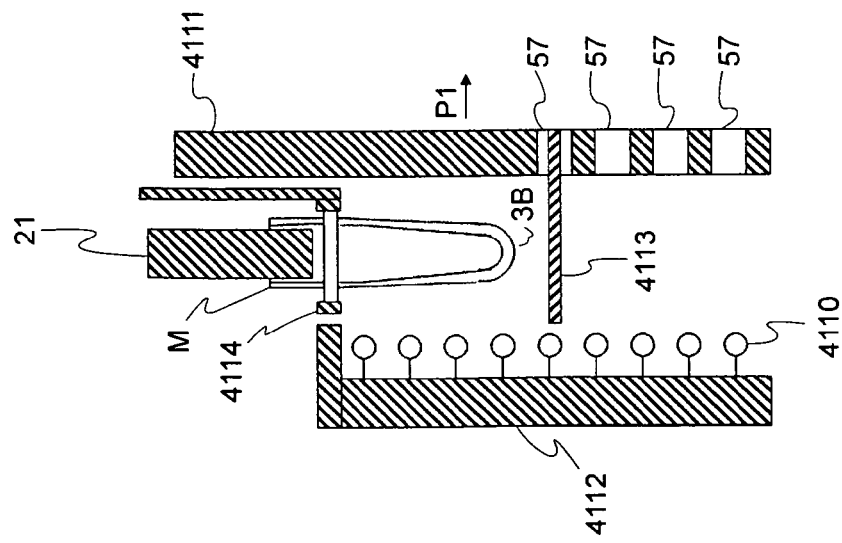

FIG. 12 to FIG. 14, in which not all of the heating elements 4110 are provided with a reference sign for the sake of clear illustration, show the process of a displacement of the reflectors 4111 to 4113, when it is changed over from a shorter preform 3B to a longer preform 3A. At this, starting from the state of FIG. 12, the counter reflector 4111 is moved in the direction of an arrow P1 in FIG. 12, namely in the transverse direction to the back reflector 4112, away from the back reflector 4112 and/or a preform 3. As a result, the bottom reflector 4113 is no longer arranged in the opening 57, as shown in FIG. 13. After that, the bottom reflector 4113 can be moved in the direction of an arrow P2 in FIG. 13 to the bottom of FIG. 13 by a driving via the driving device 54 (FIG. 11). Subsequently, the counter reflector 4111 can again be moved to the back reflector 4112 in the direction of an arrow P3 in FIG. 14, namely in the transverse direction to the back reflector 4112, as shown in FIG. 14. As a result, the bottom reflector 4113 is inserted in this case in the bottom most opening 57 of the counter reflector 4111. Due to this, a longer preform 3A can be held by the mandrel 21 between the reflectors 4111 to 4114 and be guided in between them. As described above, the change over from a shorter preform 3B to a longer preform 3A can be performed herein particularly automatically or partly automatically on the basis of the preform data, particularly their geometry, stored in the storing device 70 (FIG. 6 and FIG. 7).

Since the bottom reflector 4113 can also be a very thin blank sheet, the openings 57 can be configured rather narrow. However, it is also conceivable, that at least the openings 57 arranged in the heating channel are closed with a filling device which is not shown when it comes to longer preforms 3A. The filling devices can also be reflecting.

With the shown configuration, collisions can be prevented which could happen when jointly advancing or moving, which can be particularly continuously, the reflectors 4111, 4112, 4113, since the bottom reflector 4113 is insertable in the counter reflector 4111.

Because of the arrangement of the heating elements 4110, the counter reflector 4111, the back reflector 4112, the bottom reflector 4113 and the top reflector 4114, the bottom reflector 4113 is moveable between the heating elements 4110 and the counter reflector 4111. In other words, the bottom reflector 4113 is moveable relative to the counter reflector 4111. Further, the bottom reflector 4113 is moveable relative to the heating elements 4110. In addition, the counter reflector 4111 and the back reflector 4112 are moveable relative to each other. The counter reflector 4111 and/or the bottom reflector 4113 can be driven to the respective preform 3A, 3B as far as desired.

Due to this it is possible, to set the heating channel formed in the heating device 40 for the preforms 3 even closer for different preforms 3 or 3A, 3B or on the basis of staggered tolerance to achieve a better energy exploitation.

This principle is also applicable in another type of heating device 40, in which the preforms 3 or 3A, 3B are transported in heating bags surrounding the single preforms—each for himself.

Sixth Embodiment

Figure 15:
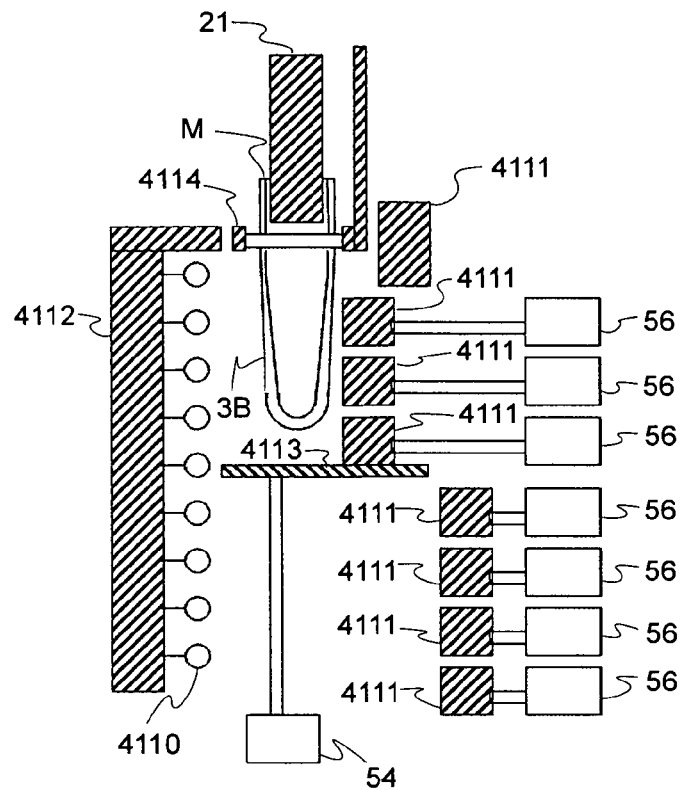
FIG. 15 and FIG. 16 each show a partial sectional view of a heating device according to a sixth embodiment.
Figure 16:
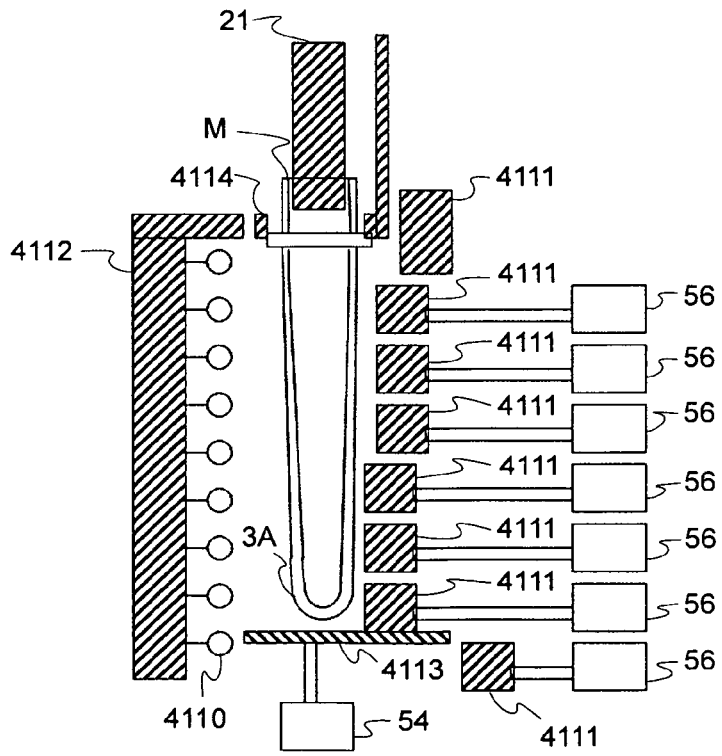

FIG. 15 and FIG. 16 each show a layout of the reflectors 4111, 4112, 4113, 4114 in which the counter reflector 4111 is separated in a plurality of segments arranged side by side or one below the other in a row. Herein, the top most segment of the counter reflector 4111 arranged in the vicinity of the mouth piece M of the preform 3B (FIG. 15), 3A (FIG. 16) is arranged fix in the configuration shown in FIG. 15 and FIG. 16. The other segments of the counter reflector 4111 can be moved each separately with a driving device 56 or one of the driving devices 56 transverse to the back reflector 4112 and/or a preform 3 or 3A, 3B, as shown in FIG. 15 and FIG. 16. The fixation of the respective segment of the counter reflector 4111 at the driving device 56 can be configured as a telescope, as shown in FIG. 15 and FIG. 16. Because of this movement a compartment can be created, in which the bottom reflector 4113 can move translatory along the segments of the counter reflector 4111. The bottom reflector 4113 can be moved in this case by the use of the driving device 54 so far that it abuts from below on the segments of the counter reflector 4111, such that a compartment closed downward is formed around the preform 3A, 3B. For the sake of a clear illustration, not all of the heating elements 4110 are provided with a reference sign in FIG. 15 and FIG. 16.

Also in that way the bottom reflector 4113 can be inserted, particularly continuously, into the counter reflector 4111. It is further possible to change over also in this way between a heating of a shorter preform 3B, 3A and the heating of a longer preform 3B, 3A and vice versa. The segments of the counter reflector 4111 and/or the bottom reflector 4113 can be driven to the respective preform 3A, 3B as far as desired.

It is possible to blow between the segments of the counter reflector 4111 for example air in the area between the reflectors 4111, 4112, 4113, 4114, the air serving particularly as a surface cooling for the preform 3 or 3A, 3B.

In other respects, this embodiment is configured as described with respect to the fifth embodiment.

Seventh Embodiment

Figure 17:
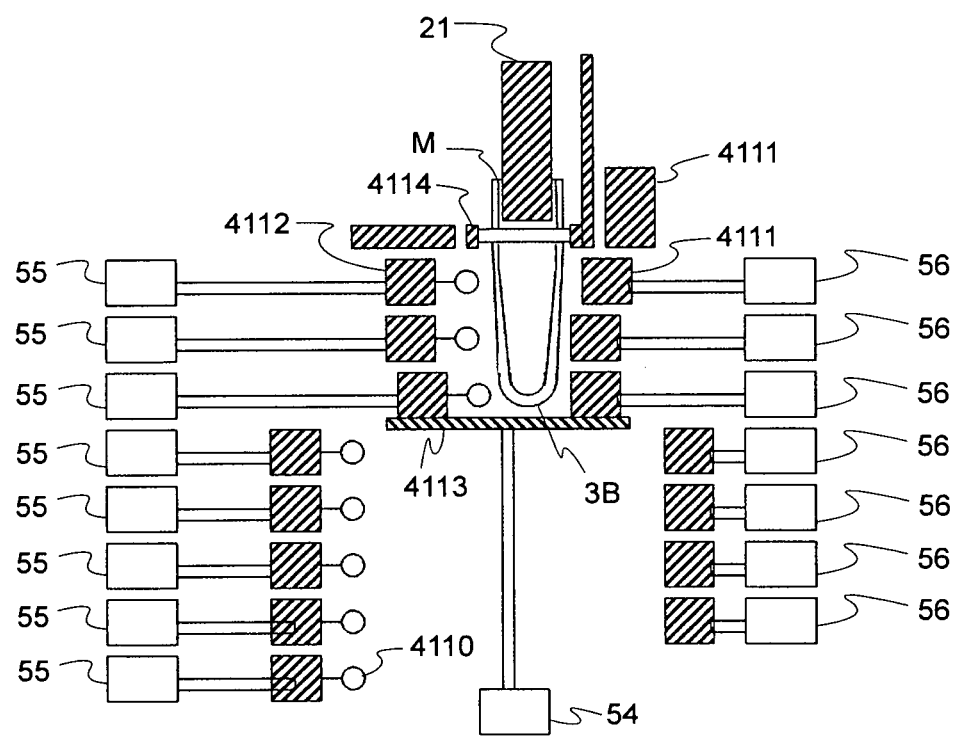
FIG. 17 shows a partial sectional view of a heating device according to a seventh embodiment.

FIG. 17 shows a configuration of the reflectors 4111, 4112, 4113, 4114 in which not only the counter reflector 4111 but also the back reflector 4112 is separated in a plurality of segments which are arranged side by side or below one another in a row. Herein, the counter reflector 4111 is constructed as described with reference to the sixth embodiment. For the sake of a clear illustration, not all of the heating elements 4110 and not all of the segments of the counter reflector 4111 or the back reflector 4112 are provided with a reference sign in FIG. 17.

Regarding the back reflector 4112, each of the segments thereof are moveable transverse to the counter reflector 4111 and/or a preform 3 or 3B by a driving device 55, as shown in FIG. 17. This movability is similar to the movability of the segments of the counter reflector 4111. Therewith again, a compartment can be created in which the bottom reflector 4113 can move translatory along of segments of the counter reflector 4111 and of segments of the back reflector 4112. The bottom reflector 4113 can herein be moved by the use of the driving device 54 so far that it abuts from below on one of the segments of the counter reflector 4111 and/or one of the segments of the back reflector 4112, so that a compartment closed downwards is formed around the preform 3A, 3B. Also in this way it is possible to change over between the heating of a shorter and a longer preform 3B, 3A and vice versa. The segments of the counter reflector 4111 and/or the segments of the back reflector 4112 can be driven separately to the preform 3A, 3B as far as desired.

With the shown configuration collisions can be prevented when jointly advancing or moving the reflectors 4111, 4112, 4113, particularly continuously, since the bottom reflector 4113 can be inserted both in the counter reflector 4111 and the back reflector 4112.

Such as it is possible to blow air between the segments of the counter reflector 4111, it is also possible to blow between the segments of the back reflector 4112 for example air in the area between the reflectors 4111, 4112, 4113, 4114, the air serving particularly as a surface cooling for the preform 3 or 3A, 3B.

Even if it is not shown in FIG. 17, also the bottom reflector 4113 can be configured segmented. Herein, the separate segments of the bottom reflector 4113 can be moved similarly to the moving of the segments of the counter reflector 4111 and/or the segments of the back reflector 4112.

In other respects, this embodiment is configured as described with respect to the sixth embodiment.

Eighth Embodiment

Figure 18:
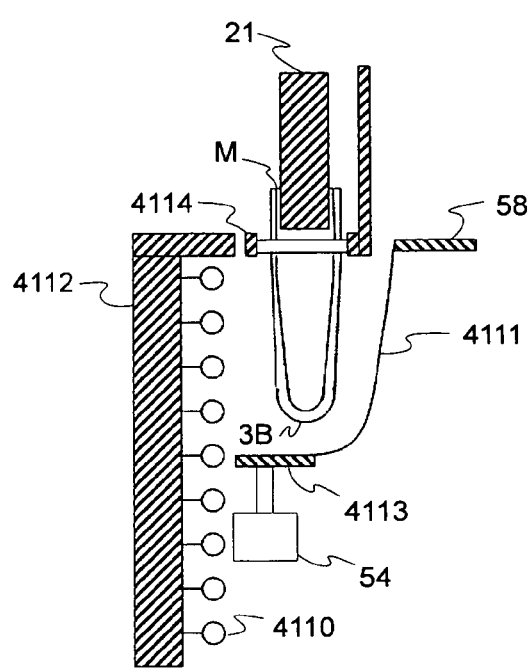
FIG. 18 and FIG. 19 each show a partial sectional view of a heating device according to an eighth embodiment.
Figure 19:
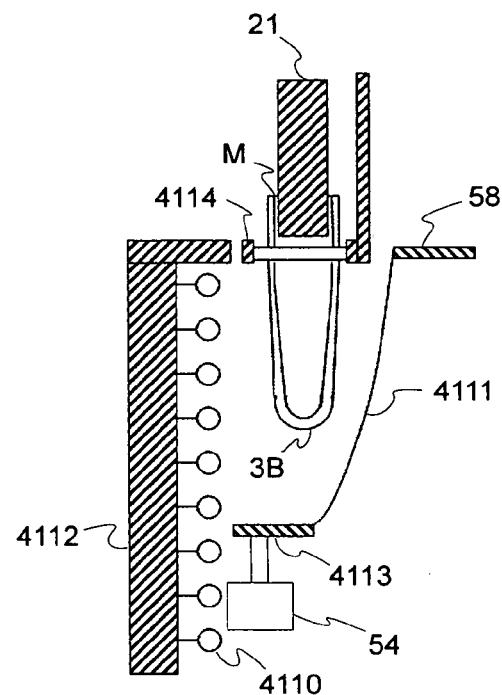

FIG. 18 and FIG. 19 each show a configuration of the reflectors 4111, 4112, 4113, 4114, in which the counter reflector 4111 is formed as a flexible element, for example a foil able to reflect radiation, a film able to reflect radiation, etc. The counter reflector 4111 is thus a bendable reflector. At least the surface of the counter reflector 4111, which is faced to the preform 3B, is made particularly from metal. In FIG. 18 and FIG. 19, not all of the heating elements 4110 are provided with a reference sign for the sake of a clear illustration.

The counter reflector 4111 is arranged in FIG. 18 and FIG. 19, respectively, at its one end at an upper holder 58. At its other end, the counter reflector 4111 is arranged at the bottom reflector 4113. If the bottom reflector 4113 is moved translatory, for example with the driving device 54, up or down in FIG. 18, the counter reflector 4111 bends, as shown in FIG. 18 an FIG. 19. Due to this, the counter reflector 4111 and the bottom reflector 4113 are moved jointly. The movement of the bottom reflector 4113 causes a movement of the counter reflector 4111.

With the shown configuration, collisions can be prevented when jointly advancing or moving the reflectors 4111, 4113, particularly continuously, since the reflector 4111 is configured flexible.

In other respects, this embodiment is configured as described with respect to the fifth embodiment.

Ninth Embodiment

Figure 20:
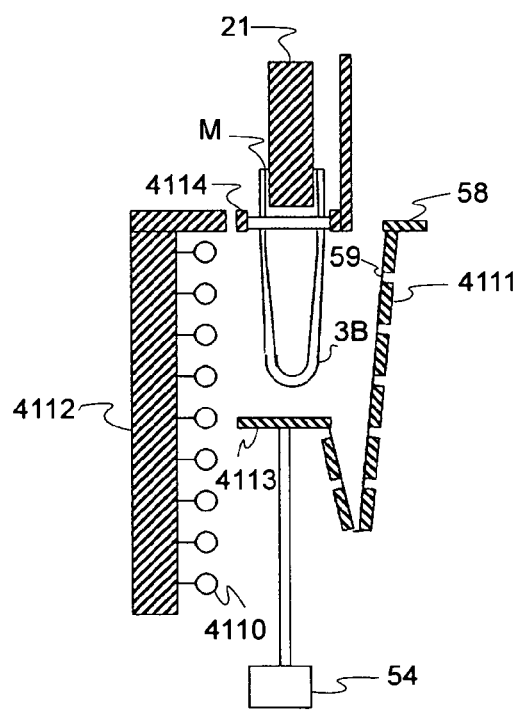
FIG. 20 shows a partial sectional view of a heating device according to a ninth embodiment.

FIG. 20 shows a further alternative for a bendable reflector. In this embodiment, the counter reflector 4111 is a flexible chain in which plural segments are combined with each other via a connection 59. In FIG. 20, not all of the heating elements 4110 are provided with a reference sign for the sake of a clear illustration.

Also in FIG. 20, the counter reflector 4111 is arranged at its one end at an upper holder 58. At its other end, the counter reflector 4111 is arranged at the bottom reflector 4113. Due to this, the counter reflector 4111 bends, as shown in FIG. 20, if the bottom reflector 4113 is for example moved translatory by the use of the driving device 54 up or down in FIG. 20, so that it is optimally arranged to the respective preform 3 or 3A, 3B to be heated. Particularly, the single segments of the counter reflector 4111 fold, as shown in FIG. 20. Thus, also here, the counter reflector 4111 and the bottom reflector 4113 are moved jointly. The movement of the bottom reflector 4113 causes a movement of the counter reflector 4111.

Thus, also in this embodiment collisions can be prevented when jointly advancing or moving the reflectors 4111, 4113, particularly continuously, since the reflector 4111 is configured flexible.

In other respects, this embodiment is configured as described with respect to the eighth embodiment.

(Miscellaneous)

All above-described configurations of the blow molding machine 1, the heating device 40 and the above-described heating method can be used separately or in all possible combinations. The first to ninth embodiments can arbitrarily be combined with each other. In addition, particularly the following modifications are conceivable.

The parts shown in the figures are illustrated schematically and can diverge in the exact configuration from the form shown in the figures as long as their functions described above are ensured.

It is also possible to select other sizes for the preforms 3A, 3B as mentioned in the above description. Particularly, the longer preform 3A can be a preform 3 from which a container 2 or a bottle with a maximal content of approximately 1.5 liter or 2.0 liter shall be formed, whereas as the shorter preform 3B again a preform 3 is selected, from which a container 2 or a bottle with a maximal content of approximately 0.5 liter shall be formed. However, the shorter preform 3B can also be a preform 3, from which a container 2 or a bottle with a maximal content of approximately 0.33 liter or 1.0 liter shall be formed. It goes without saying that also other size rates are possible.

The number of the heating elements 4110 of the heating module 411 is selectable according to the requirements. In a heating module of the heating modules 411 to 417 and 421 to 427, particularly more or less heating elements 4110 than they are shown in the figures can be used.

Moreover, the number of the heating modules 411 to 417 and 421 to 427 is selectable according to the requirements. More or less heating modules 411 to 417 and 421 to 427 than they are shown in the figures can be used.

The setting of the bottom reflectors of the heating paths 41, 42 by the use of the setting device, in addition to the setup of the heating device 40 for heating a specific preform 3 or 3A, 3B, as described above, can also be effected during the heating of the preforms 3 or 3A, 3B by the heating device 40. During a heating of preforms 3 or 3A, 3B, the bottom reflectors can be fine adjusted or fine set, if it is noticed, for example with a quality detecting device for detecting the quality of the preforms 3 or 3A, 3B heated by the heating device 40, that the detected quality is not sufficient. The fine setting is preferably also a continuous setting. However, the fine setting does not have to be effected only during a heating of the preforms 3 or 3A, 3B by the heating device 40. The fine setting can also be effected in addition to a preceding setting of the bottom reflector of the heating paths 41, 42, when setting up the heating device 40.

The number and/or size of the segments of the counter reflector 4111 are/is arbitrarily selectable. Further, the number and/or size of the segments of the back reflector 4112 are/is arbitrarily selectable. It is also possible that more than one segment of the counter reflector 4111 is arranged fix. Further, it is possible that also with regard to the back reflector 4112 at least one signal is arranged fix.

In the above-described embodiments, all of the reflectors, namely the counter reflector 4111, the back reflector 4112, the bottom reflector 4113 and the top reflector 4114, are displaceable, particularly automatically displaceable by a driving device 54, 55, 56. Due to this, the reflectors 4111, 4112, 4113, 4114 can adapt optimally to the geometry of the preforms 3 to be heated. Particularly, an automatic setting in respect to the preform 3 to be heated is possible by optical recognition of the geometry of the preforms 3 to be heated.

It is also conceivable, to displace the reflectors 4111, 4112, 4113, 4114 and/or the heating elements 4110 during the operation on the basis of a temperature measurement of the preform 3 or 3A, 3B at plural spots in the heating device 40. Thereby, particularly the heating elements 4110 can be operated with a constant power what increases their endurance. Further, a temperature regulation can take place, particularly simultaneously, to apply an optimal heating profile to the preforms 3 or 3A, 3B. The presetting of the target values of the temperature regulation can additionally take place via a further control cycle by measuring the wall thickness of the finished blown containers 2 at plural heights at the containers 2 and supplying the values for regulating the corresponding temperatures in the corresponding heights at the preform 3 to 3A, 3B. For example, if the wall thickness in the middle portion gets to thin, it can be concluded that the preform 3 or 3A, 3B was too hot at the corresponding location—as a result, a reflector located in the middle as regards the height can be positioned a little bit further away, or the heating element 4110 located in the corresponding height can be decreased in its power.

Like the driving device 54, also the driving devices 55, 56 can be an electric, pneumatic or electro mechanic positioning driving device, for example.

In the above-described embodiments, at least one reflector 4111, 4112, 4113, 4114, particularly the bottom reflector 4113, is displaceable in at least two axes.

The heating device 40 can use other radiation than infrared radiation, which can also be referred to as non-infrared radiation (NIR-Radiation), for heating the preforms 3.

The preforms 3 can be arranged in the heating device 40 such that they are heated standing or hanging. Due to this, the heating device 40 is configured correspondingly.

One of the reflectors 4111, 4112, 4113, 4114, particularly the bottom reflector 4113, can be a polished metal reflector. Therewith, the reflector 4111, 4112, 4113, 4114 can be configured as thin as possible.

Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

We claim:

1. Heating device for a blow molding machine, comprising:
    a heating element for radiating heat radiation for heating of preforms;
    a bottom reflector being movable relative to a counter reflector arranged opposite to the heating element and being for reflection of heat radiation radiated by the heating element in the direction of the preforms;
    a setting device for setting a position of the bottom reflector relative to the counter reflector; and
    a determining device for determining a predetermined position of the bottom reflector dependent on the length of a preform to be heated by the heating device; wherein the setting device is configured for setting the position of the bottom reflector dependent on the determination of the determining device;
    wherein the determining device comprises at least one of a storing device in which is stored a predetermined position of the bottom reflector dependent on the length of a preform to be heated by the heating device, and/or a bottom reflector detecting device for detecting the position of the bottom reflector and/or a preform length detecting device for detecting the length of the preforms present in the heating device; and wherein at least one of the bottom reflector detecting device and/or the preform length detecting device is/are arranged at the intake of the heating device as is seen in the transport direction of the preforms, or ahead of the heating device.

2. The heating device according to claim 1, wherein the bottom reflector can be inserted into the counter reflector or a back reflector arranged on the side of the heating element, or wherein the counter reflector is configured flexible.

3. The heating device according to claim 1, further comprising a back reflector being arranged on the side of the heating element;

wherein the setting device is configured for continuous setting and/or fine setting of the bottom reflector, and/or the counter reflector and/or the back reflector can be continuously settable by a driving device.

4. A heating device for a blow molding machine, comprising:

a heating element for radiating heat radiation for heating of preforms;

a bottom reflector being movable relative to a counter reflector arranged opposite to the heating element and being for reflection of heat radiation radiated by the heating element in the direction of the preforms;

a setting device for setting a position of the bottom reflector relative to the counter reflector;

a first support device for supporting the bottom reflectors of a first heating path;

a second support device for supporting the bottom reflectors of a second heating path; and a coupling device for coupling the first and second support device with a drive device arranged for driving the coupling device and therewith the first and second support device.

5. The heating device according to claim 4, further comprising a determining device for determining a predetermined position of the bottom reflector dependent on the length of a preform to be heated by the heating device, wherein the setting device is configured for setting the position of the bottom reflector dependent on the determination of the determining device.

6. The heating device according to claim 5, wherein the determining device comprises at least one of a storing device for storing a predetermined position of the bottom reflector dependent on the length of a preform to be heated by the heating device, and/or a bottom reflector detecting device for detecting the position of the bottom reflector and/or a preform length detecting device for detecting the length of the preforms present in the heating device.

7. The heating device according to claim 6, wherein at least one of the bottom reflector detecting device and/or the preform length detecting device is/are arranged at the intake of the heating device as is seen in the transport direction of the preforms, or ahead of the heating device.

8. The heating device according to claim 1, further comprising a plurality of heating elements each being arranged adjacent to each other and side by side in direction of the length of the preforms and being for radiating heat radiation for heating the preforms, wherein the number of the plurality of heating elements used for heating the preforms is adaptable by a control device on the basis of the determining result of the determining device.

9. The heating device according to claim 1, wherein the setting device comprises an electric or pneumatic or electromechanical driving device for setting the position of the bottom reflector.

10. The heating device according to claim 1, wherein the bottom reflector is arranged transverse to the counter reflector or has a cavity on the side which is faced to the preforms, wherein the cavity corresponds to the form of the preforms.

11. The heating device according to claim 1, further comprising:

two heating paths arranged in parallel to each other and behind one another in the transport direction of the preforms, wherein each heating path comprises at least one bottom reflector, and wherein the setting device is configured for jointly setting the predetermined position of all of the bottom reflectors of the two heating paths.

12. The heating device according to claim 1, wherein the heating device is configured such that a displacement of at least two limitations of its heating channel is performed by a shared drive, particularly automatically.

13. Blow molding machine for producing containers being for acceptance of a product and being formed from preforms, comprising a heating device according to claim 1.

14. A heating method for a blow molding machine according to which a bottom reflector is movable relative to a counter reflector arranged opposite to a heating element, wherein a back reflector is arranged on the side of the heating element, the heating method comprising the steps of:

setting a position of the bottom reflector relative to the counter reflector by a setting device;

reflecting heat radiation in the direction of the preforms by the bottom reflector, the heat radiation being radiated by the heating element; and determining, by a determining device, a predetermined position of the bottom reflector dependent on the length of a preform to be heated by the heating device, wherein the setting device is configured for setting the position of the bottom reflector dependent on the determination of the determining device;

wherein the determining device comprises at least one of a storing device in which is stored a predetermined position of the bottom reflector dependent on the length of a preform to be heated by the heating device, and/or a bottom reflector detecting device detecting the position of the bottom reflector and/or a preform length detecting device detecting the length of the preforms present in the heating device; and wherein at least one of the bottom reflector detecting device and/or the preform length detecting device is/are arranged at the intake of the heating device as is seen in the transport direction of the preforms, or ahead of the heating device.

15. The heating device according to claim 1, further comprising:

a plurality of heating elements for radiating heat radiation for heating preforms, the plurality of heating element being arranged side by side to one another;

wherein the plurality of heating elements is movable to be arranged corresponding to the form of the preform.

16. The heating device according to claim 15, further comprising a back reflector being arranged on the side of the heating element;
   wherein at least one of the back reflector, the counter reflector, and the bottom reflector comprises a plurality of segments arranged side by side to one another and movable to be arranged corresponding to the form of the preform.

17. The heating device according to claim 1, further comprising:
   a back reflector being arranged on the side of the heating element;
   wherein at least one of the back reflector, the counter reflector, and the bottom reflector comprises segments which are separately displaceable relative to the heating element or the preforms.

18. The heating device according to claim 17, wherein the bottom reflector is moveable transverse to the counter reflector or the back reflector.

19. The heating device according to claim 17, wherein the segments can be arranged in the direction of a first transport direction of the preforms or transverse to the first transport direction of the preforms.

20. The heating device according to claim 1, further comprising
   a back reflector being arranged on the side of the heating element and being for reflection of heat radiation not absorbed by the preforms again back to the preform and/or the preforms arranged in front of or behind the preform,
   wherein at least one of the counter reflector and the back reflector is movable relative to the bottom reflector or the preform.

21. A heating method for a blow molding machine according to which bottom reflectors are movable relative to a counter reflector arranged opposite to a heating element, the heating method comprising the steps of:
   supporting bottom reflectors of a first heating path by a first support device;
   supporting bottom reflectors of a second heating path by a second support device;
   coupling, by a coupling device, the first and second support devices with a drive device arranged for driving the coupling device and therewith the first and second support devices;
   setting a position of the bottom reflector relative to the counter reflector by a setting device;
   radiating heat radiation for heating of preforms by a heating element; and
   reflecting heat radiation radiated by the heating element in the direction of the preforms.

* * * * *